E. E. METZGER & A. F. BREITENSTEIN.
TESTING DEVICE.
APPLICATION FILED JAN. 28, 1918.
1,281,805.
Patented Oct. 15, 1918.
4 SHEETS—SHEET 1.
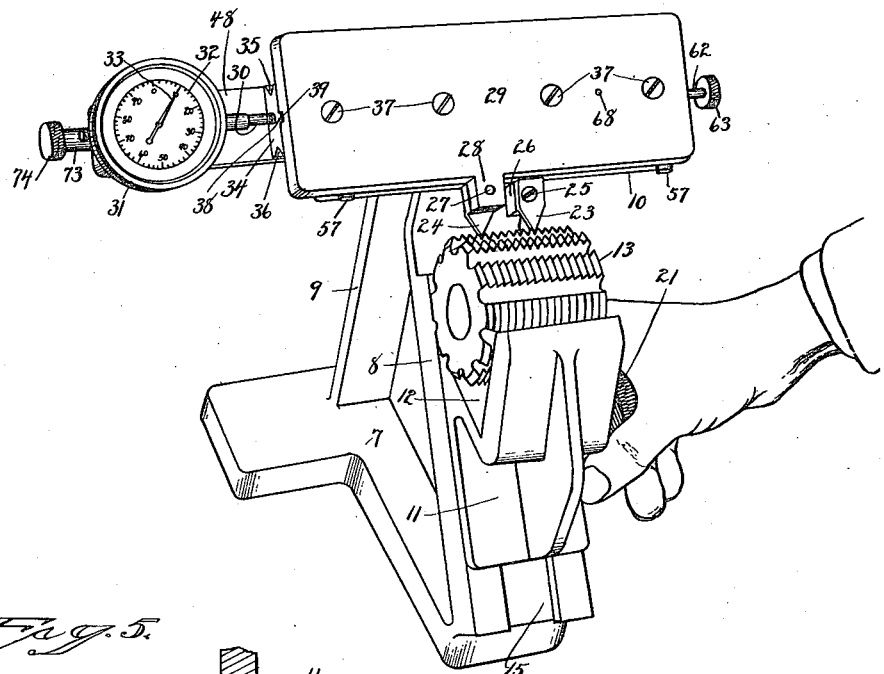
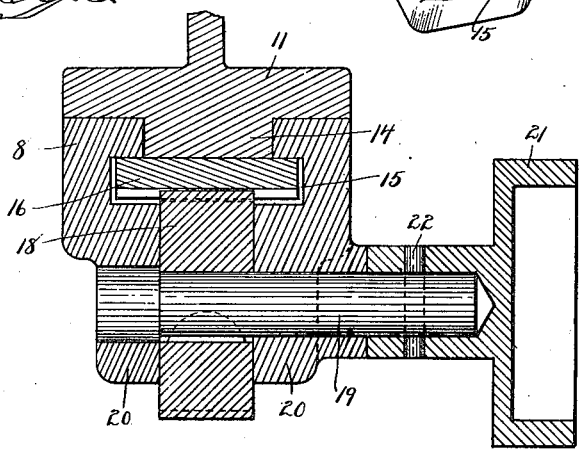

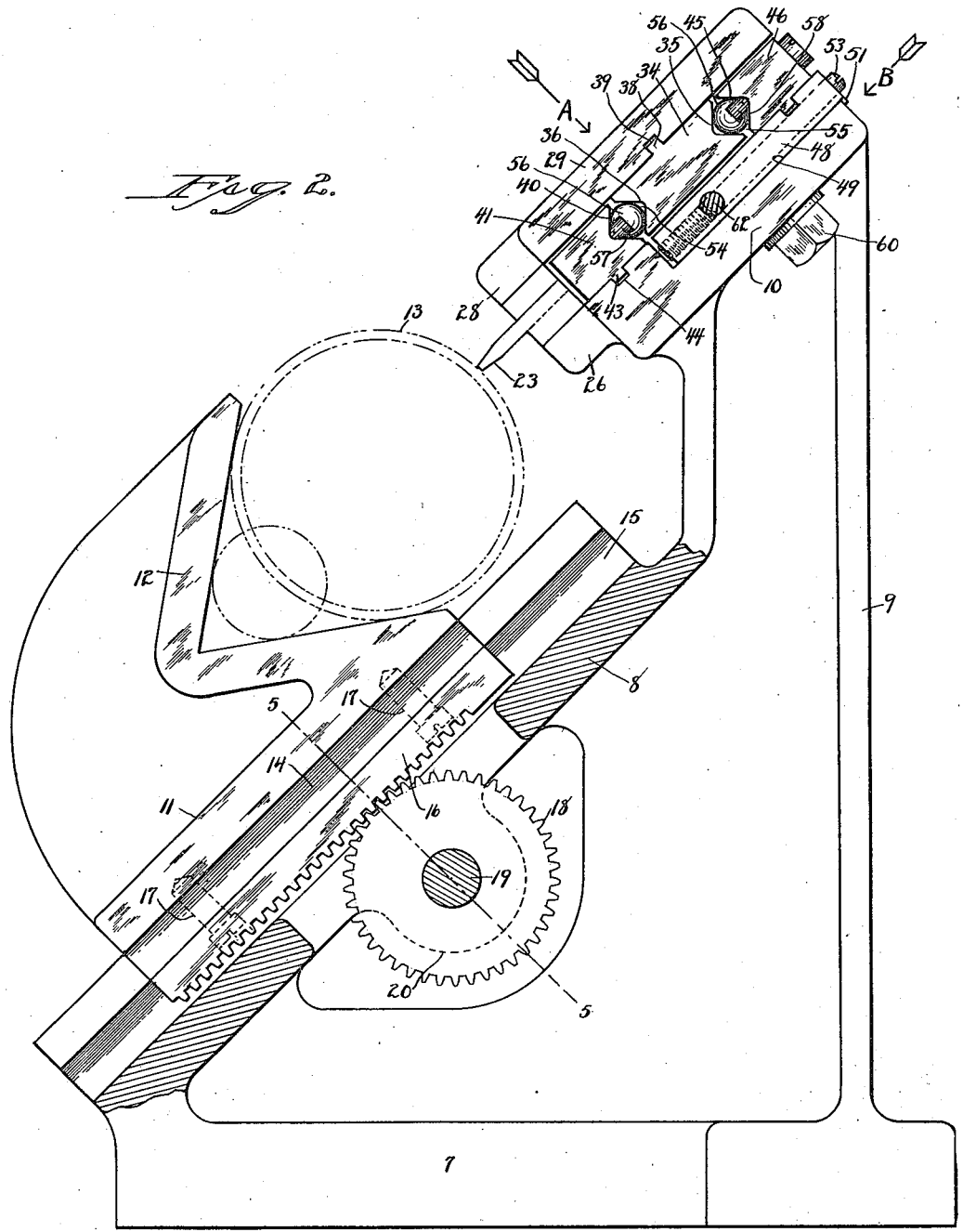

E. E. METZGER & A. F. BREITENSTEIN.
TESTING DEVICE.
APPLICATION FILED JAN. 28, 1918.
1,281,805.
Patented Oct. 15, 1918.
4 SHEETS—SHEET 3.
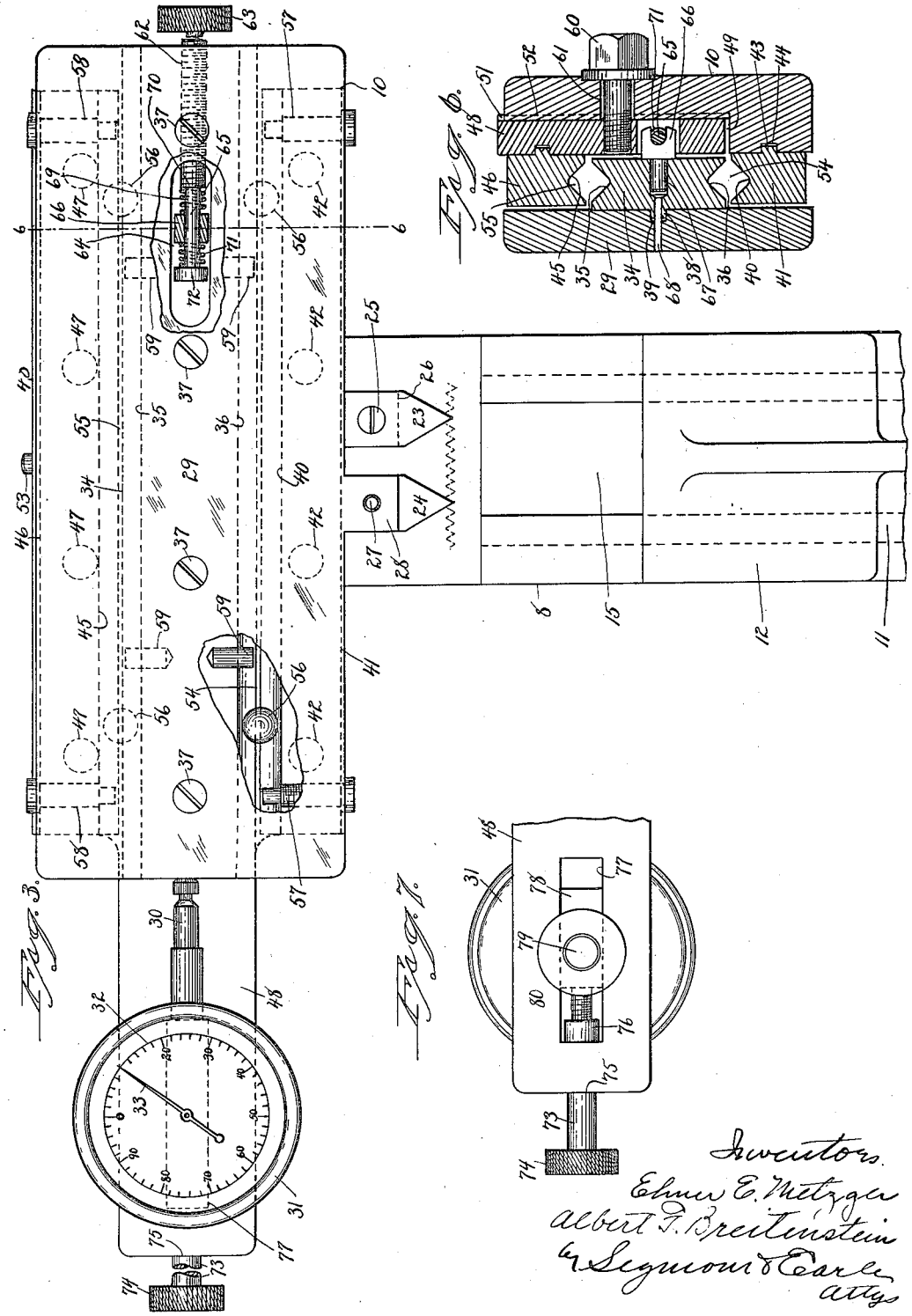

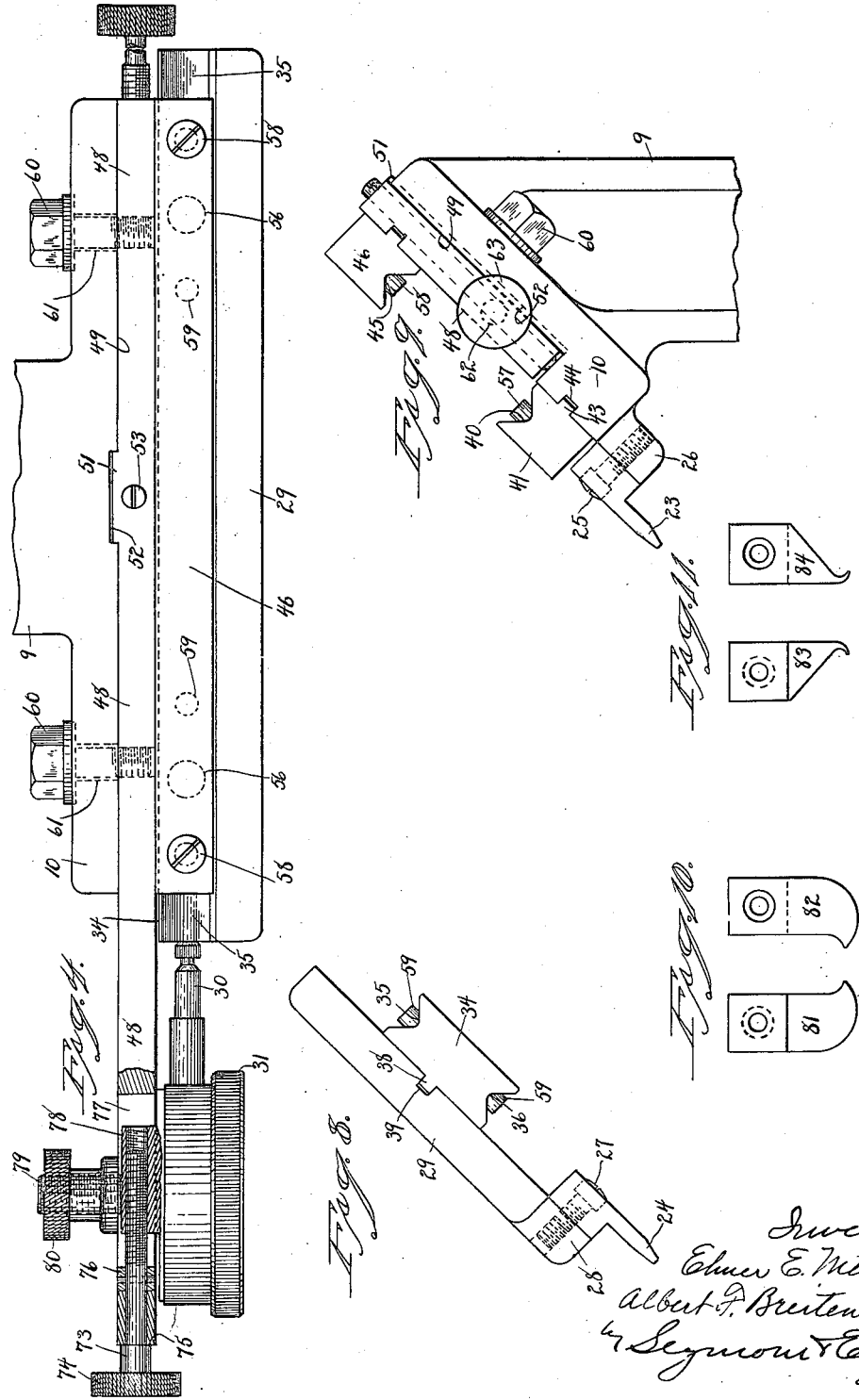

UNITED STATES PATENT OFFICE.

ELMER E. METZGER AND ALBERT F. BREITENSTEIN, OF NEW HAVEN, CONNECTICUT, ASSIGNORS TO THE GEOMETRIC TOOL COMPANY, OF NEW HAVEN, CONNECTICUT, A CORPORATION.

TESTING DEVICE.

1,281,805.

Specification of Letters Patent.

Patented Oct. 15, 1918.

Application filed January 28, 1918. Serial No. 214,083.

*To all whom it may concern:*

Be it known that we, ELMER E. METZGER and ALBERT F. BREITENSTEIN, citizens of the United States, residing at New Haven, in the county of New Haven and State of Connecticut, have invented a new and useful Improvement in Testing Devices; and we do hereby declare the following, when taken in connection with the accompanying drawings and the characters of reference marked thereon, to be a full, clear, and exact description of the same, and which said drawings constitute part of this application, and represent, in—

Figure 1 a perspective view of our improved testing device.

Fig. 2 a view thereof partly in side elevation, and partly in vertical section.

Fig. 3 a broken face view thereof looking in the direction of the arrow A of Fig. 2.

Fig. 4 a broken top view thereof looking in the direction of the arrow B of Fig. 2, with the gage-adjusting mechanism in section.

Fig. 5 a sectional view on the line 5—5 of Fig. 2.

Fig. 6 a sectional view on the line 6—6 of Fig. 3.

Fig. 7 a broken view in rear elevation of the gage-carrying plate of the device.

Fig. 8 a detached edge view of the gage-operating slide of the device and the double ball-track bar which is fastened to the inner face thereof.

Fig. 9 a broken view in edge elevation of the head of the device, showing the two single ball-track bars and the adjustable gage-carrying plate.

Fig. 10 a detached view of testing fingers adapted for the measurements of outside dimensions.

Fig. 11 a corresponding view of testing fingers adapted for testing inside dimensions.

Our invention relates to an improved testing device primarily designed for testing the lead or pitch of screw threads, but not so limited, the object being to produce a simple, accurate and convenient device of the character described.

With these ends in view, our invention consists in a testing device characterized by having a self-contained gage operated by a slide to which the article to be tested is directly applied.

Our invention further consists in a testing device having certain details of construction and combinations of parts as will be hereinafter described and pointed out in the claims.

In carrying out our invention as herein shown, we employ a frame preferably cast in one piece and comprising a base 7, an inclined, slotted guideway 8, an upright 9, and an inclined head 10. Upon the inclined guideway, we mount a carriage 11 having a V-shaped seat 12 for the reception and self-centering of the objects to be tested. As shown in Figs. 1 and 2, a specimen tap 13 has been centered in the seat 12. The said carriage is formed upon its lower face with a central rib 14 fitting into the outer portion of an undercut or T-slot 15 in the guideway, the inner portion of the said slot receiving a rack 16 secured to the rib 14 by screws 17 as shown in Fig. 2, whereby the carriage is mounted upon the guideway with freedom to move up and down thereupon. The said rack is meshed into by a pinion 18 keyed to a shaft 19 journaled in bearings 20 depending from the guideway and having its projecting outer end furnished with a knurled hand-wheel 21 secured to it by a pin 22.

By turning the said hand-wheel from left to right, the carriage 11 is raised to force the threads of the tap 13 into engagement with a stationary testing point or finger 23 and a movable testing point or finger 24, the two fingers being spaced apart side by side and the former being fastened by a screw 25 to the outer face of a lug 26 of the head 10, while the latter is fastened by a screw 27 to the under face of a lug 28 off-setting from the lower edge of a longitudinally movable gage-operating slide 29 the left hand end of which is engaged by the adjustable spring plunger 30 of a self-contained multiplying dial gage 31 of any approved type and not necessary to describe more than to say that it has a graduated dial 32 swept by a pointer 33.

Upon the inner face of the slide 29, we locate a double, ball-track bar 34 having balltracks 35 and 36 in its upper and lower edges respectively. This bar is secured in place by screws 37 and positioned by a rib 38 entering a central longitudinal groove 39 extending throughout the length of the slide. The ball-track 36 is complemented by a ball-track 40 formed in the upper edge of a single ball-track bar 41 fastened by screws 42 to the upper face of the lower edge of the head 10 aforesaid, the said bar being positioned by a rib 43 entering a groove 44 in the head. The ball-track 35 is complemented by a ball-track 45 in the lower edge of a single ball-track bar 46 fastened by screws 47 to the outer edge of the upper face of an adjustable gage-carrying plate 48 located in a shallow recess 49 in the outer face of the head 10. The said plate 48 is formed upon the center of its under face with a transverse guide-rib 51 entering a corresponding transverse groove 52 in the head 10, whereby the plate is prevented from canting with respect to the said head. An adjusting screw 53 extending downward through the plate 48 and bearing upon the bottom of the recess 49 aforesaid, as shown in Fig. 9, provides for adjusting the plate so as to adjust the position of the bar 46 with respect to the bar 41, whereby the raceways 54 and 55 (Fig. 6) are contracted or expanded as may be required, to take up any play between the several tracks forming them and four balls 56 respectively located at points substantially at the four corners of the slide 29. The ends of the raceways 54 are blocked to prevent the escape of its balls, by means of screws 57 in the bar 41, while the ends of the raceway 55 are blocked to prevent the escape of its balls by screws 58 in the bar 46. On the other hand, the balls are prevented from running together by four studs 59 in the bar 34, two of these studs projecting outward from the track 35 therein and two projecting outward from the track 36 therein. When the plate 48 has been properly adjusted by the screw 53, it is clamped solidly in place by means of two clamping-screws 60 passing through circular clearance-holes 61 in the head 10 and entering tapped holes in the slide 48, as shown in Fig. 6, the clearance-holes 61 being enough larger in diameter than the diameter of the bolts, to permit the slide 48 to be adjusted as required.

To set the finger 24 carried by the slide 29 in spaced relation to the stationary finger 23 fastened by the screw 25 to the integral lug 26 offsetting from the lower edge of the head 10, we employ a setting-screw 62, (Fig. 3) furnished at its outer end with a knurled button 63 and threaded into the right hand edge of the gage-carrying plate 48 which is formed with a slot 64 receiving a stem 65 forming a continuation of the inner end of the screw. The slide 29 is yieldingly coupled to the screw 62 by means of a coupling-yoke 66 entering the said slot and formed with a stem 67 by means of which it is mounted in the ball-race bar 34 fastened to the slide 29 which latter is formed with a hole 68 (Fig. 6) located in line with the said stem for the purpose of driving the same out of the bar 34, should this become necessary for making repairs. As shown in Fig. 3, the yoke 66 embraces the central portion of the stem 65 of the screw 62. A helical spring 69 interposed between the yoke and the shoulder 70 at the inner end of the screw 62, and a similar spring 71 interposed between the opposite face of the yoke and a collar 72 at the extreme end of the stem 65, provide for automatically restoring the slide to any predetermined normal position in which it may be set by the screw 62, when it is moved in either direction in testing an object for accuracy, it being understood that the slide will always be moved in one direction or the other unless the object tested is absolutely accurate and conforms to the standard.

To bodily adjust the self-contained gage 31 with respect to the slide 29 for the purpose of setting its pointer 33 at the zero mark on its dial 32, we employ a gage-setting screw 73 furnished at its outer end with a knurled button 74 and journaled in the left hand end of the plate 48 as shown in Fig. 4, the said screw being held against longitudinal movement in either direction by the engagement of its shoulder 75 with the end of the plate, and by the engagement of a collar 76 pinned to it with the outer wall of a slot 77 formed in the plate. The said slot receives a threaded lug 78 projecting from the back of the gage 31 and formed with a threaded shank 79 carrying a clamping-nut 80 which bears upon the rear face of the plate.

The mode of using our improved testing device will be understood from a description of its use for testing the lead or pitch of the screw threads of the specimen tap 13. In this connection it may be stated that the manufacturer will have a master gage (generally called the plug) constituting the standard with which the taps made for the market will be compared. Before the taps made for the market are put upon the market, they must be individually compared with such master gage; our improved testing device provides the instrument for this comparison. In the first place, the master gage will be placed in the seat 12 of the carriage 11 after which the knurled hand-wheel 21 will be turned to lift the master gage until its threads are brought into close proximity with the fingers 23 and 24. The finger-button 63 will now be turned to shift the finger 24 in one direction or the other with respect to the finger 23 so that the separation between the points of the fingers will approximately correspond to the separation of the threads on the master gage to be utilized for the comparison. The hand-wheel will now be further turned and the master gage raised until the fingers 23 and 24 are forced into the bottoms of the threads selected for the test. The knurled button 74 is then turned to bodily move the dial gage 31 with respect to the slide 29 until its pointer 33 is caused to register zero on the dial 32 by the co-action of the plunger 30 and the slide 29 which are maintained constantly in engagement by the spring of the plunger. The clamping-nut 80 is now turned to firmly bind the gage to the plate 48 which is in effect a part of the frame of the device. The device having been set as described, the carriage is allowed to descend under the control of the hand-wheel 21 and the master gage removed from it. One of the taps to be tested is now placed in the carriage which is lifted until the points of the two fingers 23 and 24 are forced to the bottom of those two of its threads which correspond to the threads entered by them in the master gage. If the pitch of the threads is correct, the pointer 33 of the dial gage 31 will register zero, but if the pitch is incorrect, it will act, through the finger 24, upon the slide 29 and move the same in one direction or the other against the tension of one or the other of the two springs 69 or 71, with a corresponding movement of the plunger 30, and hence of the pointer 33. Thus if the lead or pitch of the screw thread of the tap being compared, is less than the proper lead, the pointer will register to the left of the zero mark, while if it is greater than the correct lead, it will register to the right of the zero mark. As shown in Fig. 1, the tap 13 being compared is .001 of an inch in excess of the correct lead. The above description illustrates the mode in which our improved testing device is used and the priniple of its operation, whether used for testing taps or other objects.

If it is desired to use our improved testing device for testing outside dimensions, such as rods, tubes, etc., the fingers 23 and 24 will be replaced by fingers 81 and 82 having inwardly turned points as shown in Fig. 10. On the other hand, if the device is to be used for testing inside measurements of tubes, recesses, etc., the fingers 23 and 24 will be replaced by fingers 83 and 84 having outwardly turned points, as shown in Fig. 11.

We claim:—

1. In a testing device, the combination with a frame having a stationary testing point, of a slide carrying a complementary testing point in spaced relation to the said stationary testing point, and a bodily adjustable self-contained gage co-acting with the slide for actuation thereby.

2. In a testing device, the combination with a frame having a stationary testing point, of a slide carrying a complementary point of a slide carrying a complementary testing point in spaced relation to the said stationary testing point, means for adjusting the said slide for predetermining the spacing apart of the said points, a bodily adjustable self-contained gage operated by the slide, and means for setting the gage with respect to the slide.

3. In a testing device, the combination with a frame having a stationary testing point, of a slide mounted upon the said frame and having a complementary testing point arranged in spaced relation to the said stationary testing point, a self-contained gage operated by the said slide, and means for automatically restoring the slide means for bodily shifting the position of the said gage to a predetermined normal position when it is displaced in either direction.

4. In a testing device, the combination with a frame having a stationary testing-point, of a slide mounted upon the said frame and carrying a complementary testing-point arranged in spaced relation to the testing-point on the said frame, a self-contained gage operated by the slide, a carriage mounted upon the frame and adapted to receive the article to be tested, and means for lifting the carriage for bringing the article to be tested into position to operate the slide.

5. In a testing device, the combination with a frame furnished with a stationary testing-point and having an inclined guideway and a head, of a carriage mounted upon the said guideway, means for raising and lowering the said carriage, a slide mounted upon the said head and carrying a complementary testing-point through which it is operated by the article to be tested, and a dial gage adjustably mounted upon the said frame and operated by the said slide.

6. In a testing device, the combination with a frame furnished with a testing-point and having a guideway and a head, of a carriage mounted upon the said guideway, means for raising and lowering the said carriage, a slide mounted upon the said head and carrying a complementary testing-point through which the slide is operated by the article to be tested, anti-friction bearings interposed between the said head and slide, means for restoring the slide to a predetermined normal position and for adjusting it, and a gage operated by the said slide.

7. In a testing device, the combination with a frame furnished with a testing-point and having an inclined guideway, of a carriage mounted upon the said guideway, a rack connected with the carriage, a pinion engaging with the said rack, a hand-wheel for operating the pinion, a slide mounted upon the frame and having a complementary testing-point and adapted to be operated by the article to be tested when the same is lifted against the said point by the raising of the carriage, and a gage operated by the slide.

8. In a testing device, the combination with a frame having a testing point, of a carriage, means for operating the same, a plate-like head upon the said frame, an adjustable gage-carrying plate applied to the said head, a slide having a testing-point arranged in spaced relation to the testing point aforesaid, means for adjusting the slide and for restoring it to a predetermined normal position when moved in either direction, and a self-contained gage mounted upon the projecting end of the said plate and operated by the slide when the same is moved in one direction or the other.

9. In a testing device, the combination with a frame having an inclined guideway and an inclined head located above the same, of a carriage mounted upon the guideway and means for operating the same, an adjustable plate mounted upon the said head and projecting at one end therefrom, a slide mounted upon the said head and adjustable thereon to a predetermined position, a self-contained gage supported upon the projecting end of the said plate and having a plunger engaging with the said slide, means for restoring the slide to a predetermined normal position after having been moved in either direction from that position, a testing finger carried by the head, and a testing finger carried by the slide, these fingers being arranged in spaced relation and being adjusted with respect to each other by the adjustment of the slide.

In testimony whereof we have signed this specification in the presence of two subscribing witnesses.

ELMER E. METZGER.
ALBERT F. BREITENSTEIN.

Witnesses:
 MALCOLM P. NICHOLS,
 MYRON E. GOLD.